(12) United States Patent
Jordan

(10) Patent No.: US 9,193,285 B1
(45) Date of Patent: Nov. 24, 2015

(54) ERGONOMIC ARM SUPPORT FOR VEHICLE OCCUPANT

(76) Inventor: Roberta Lynn Jordan, Asheville, NC (US)

( * ) Notice: Subject to any disclaimer, the term of this patent is extended or adjusted under 35 U.S.C. 154(b) by 532 days.

(21) Appl. No.: 13/526,581

(22) Filed: Jun. 19, 2012

(51) Int. Cl.
*B60N 2/46* (2006.01)
*A47C 7/54* (2006.01)

(52) U.S. Cl.
CPC ............ *B60N 2/4673* (2013.01); *A47C 7/546* (2013.01); *B60N 2/4626* (2013.01)

(58) Field of Classification Search
CPC .... B63B 2029/043; B63C 9/30; B63C 9/115; A47C 7/546; B60N 2/4673; B60N 2/4626
USPC .................... 297/284.5, 411.23, 411.24, 411, 297/411.25, 411.28, 411.4; 602/20, 21; 5/646.647
See application file for complete search history.

(56) References Cited

U.S. PATENT DOCUMENTS

| | | | | |
|---|---|---|---|---|
| 2,168,976 | A | | 8/1939 | Clarke |
| 2,464,435 | A | * | 3/1949 | Conradt ............... B60N 2/4879 297/397 |
| 2,524,659 | A | | 10/1950 | Gorman |
| 2,582,571 | A | * | 1/1952 | Thoma ................. B60N 2/4879 297/397 |
| 2,602,488 | A | | 7/1952 | Conning |
| 2,650,650 | A | * | 9/1953 | Brown ...................... 297/411.25 |
| 2,724,133 | A | * | 11/1955 | Sorrell .......................... 441/127 |
| 3,117,327 | A | * | 1/1964 | Mathew ......................... 441/132 |
| 3,140,895 | A | * | 7/1964 | Straumann ................. 312/235.6 |
| 3,626,530 | A | * | 12/1971 | Ecklor ............................ 441/111 |
| 3,865,433 | A | * | 2/1975 | Stafford ................. B60N 2/286 297/471 |
| 4,050,737 | A | * | 9/1977 | Jordan ........................... 297/465 |
| 4,154,478 | A | * | 5/1979 | Cohune .................. A47C 7/383 297/397 |
| 4,173,048 | A | | 11/1979 | Varaney |
| 4,756,459 | A | * | 7/1988 | Hardman ...................... 224/275 |
| 4,788,969 | A | * | 12/1988 | Thompson .................... 606/237 |
| 4,796,315 | A | * | 1/1989 | Crew ..................... A61F 5/028 5/630 |
| 4,874,203 | A | * | 10/1989 | Henley ..................... A61G 5/00 297/250.1 |
| 5,076,264 | A | * | 12/1991 | Lonardo .................. A61F 5/01 128/874 |
| 5,310,245 | A | * | 5/1994 | Lyszczasz ................ 297/219.12 |
| 5,467,782 | A | * | 11/1995 | Wiseman ............. A61B 6/0421 5/636 |
| 5,519,906 | A | | 5/1996 | Fanto-Chan |
| 5,544,378 | A | * | 8/1996 | Chow ..................... A47C 7/383 297/397 |
| 5,588,891 | A | * | 12/1996 | Bardot .......................... 441/115 |
| D378,615 | S | * | 3/1997 | Neviaser et al. ............. D24/190 |
| 6,071,161 | A | * | 6/2000 | Weissbuch .................... 441/106 |
| 6,086,152 | A | * | 7/2000 | Zeller .................... A47C 1/143 297/219.1 |
| 6,123,389 | A | * | 9/2000 | O'Connor et al. ............ 297/397 |
| 6,164,725 | A | | 12/2000 | Santa Cruz et al. |
| 6,508,513 | B1 | * | 1/2003 | Hall ....................... A47C 7/546 297/398 |
| 6,601,804 | B2 | * | 8/2003 | Bisch ..................... A47C 7/383 248/118 |
| 6,793,287 | B2 | * | 9/2004 | Dunk .................... B60N 2/2881 297/219.12 |
| 6,893,094 | B2 | * | 5/2005 | O'Connor ............. A47C 7/383 297/397 |
| 6,929,521 | B2 | * | 8/2005 | Howerton ..................... 441/132 |
| D523,679 | S | * | 6/2006 | Illingworth ................... D6/601 |

(Continued)

*Primary Examiner* — Joshua J Michener
*Assistant Examiner* — Matthew Gitlin
(74) *Attorney, Agent, or Firm* — Monahan & Company, LLC; Timothy J. Monahan

(57) ABSTRACT

An arm support is provided for the occupant of a vehicle having a strap encircling a seat back rest, a pair of bolsters, each having one end attached to the strap in spaced apart relation, and a lumbar support attached to the strap midway between the bolsters. The bolsters lie on the seat bench and are proportioned to support the elbows and forearms of the occupant, thereby relieving neck and shoulder strain. When used by a driver, the bolsters do not interfere with operation of the vehicle and the upper arms of the driver are free to contact the seat back rest.

20 Claims, 4 Drawing Sheets

(56) References Cited

U.S. PATENT DOCUMENTS

| | | | | |
|---|---|---|---|---|
| 7,140,692 | B2 * | 11/2006 | Stoll | 297/485 |
| 7,431,396 | B1 * | 10/2008 | Dasso | 297/227 |
| 7,488,038 | B2 * | 2/2009 | Boyle | B60N 2/2806 297/250.1 |
| 7,644,990 | B2 | 1/2010 | Pearson | |
| 7,708,342 | B2 * | 5/2010 | Leach | 297/250.1 |
| 7,926,881 | B1 * | 4/2011 | Youreman | A47D 15/006 297/230.12 |
| 2002/0102891 | A1 * | 8/2002 | Anderson et al. | 441/80 |
| 2004/0060116 | A1 * | 4/2004 | Matthews Brown | 5/636 |
| 2005/0073186 | A1 * | 4/2005 | Kohani | 297/464 |
| 2006/0055215 | A1 * | 3/2006 | Potosky | 297/219.1 |
| 2006/0138851 | A1 * | 6/2006 | Stoll | B60N 2/265 297/464 |
| 2007/0135005 | A1 * | 6/2007 | Whitney | 441/127 |
| 2009/0188045 | A1 * | 7/2009 | Anikin | B60N 2/7005 5/654 |
| 2009/0206646 | A1 * | 8/2009 | Mittelstadt | 297/397 |
| 2011/0031799 | A1 * | 2/2011 | DeJoode | 297/464 |

* cited by examiner

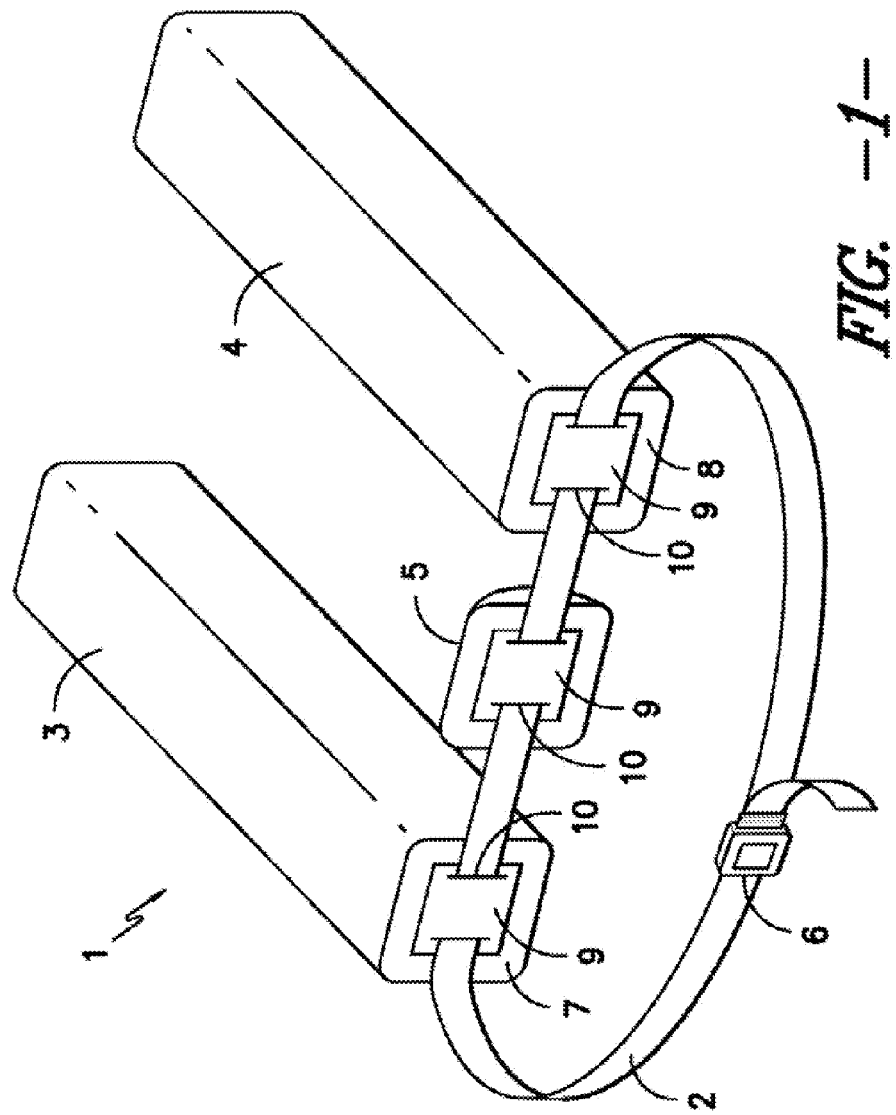

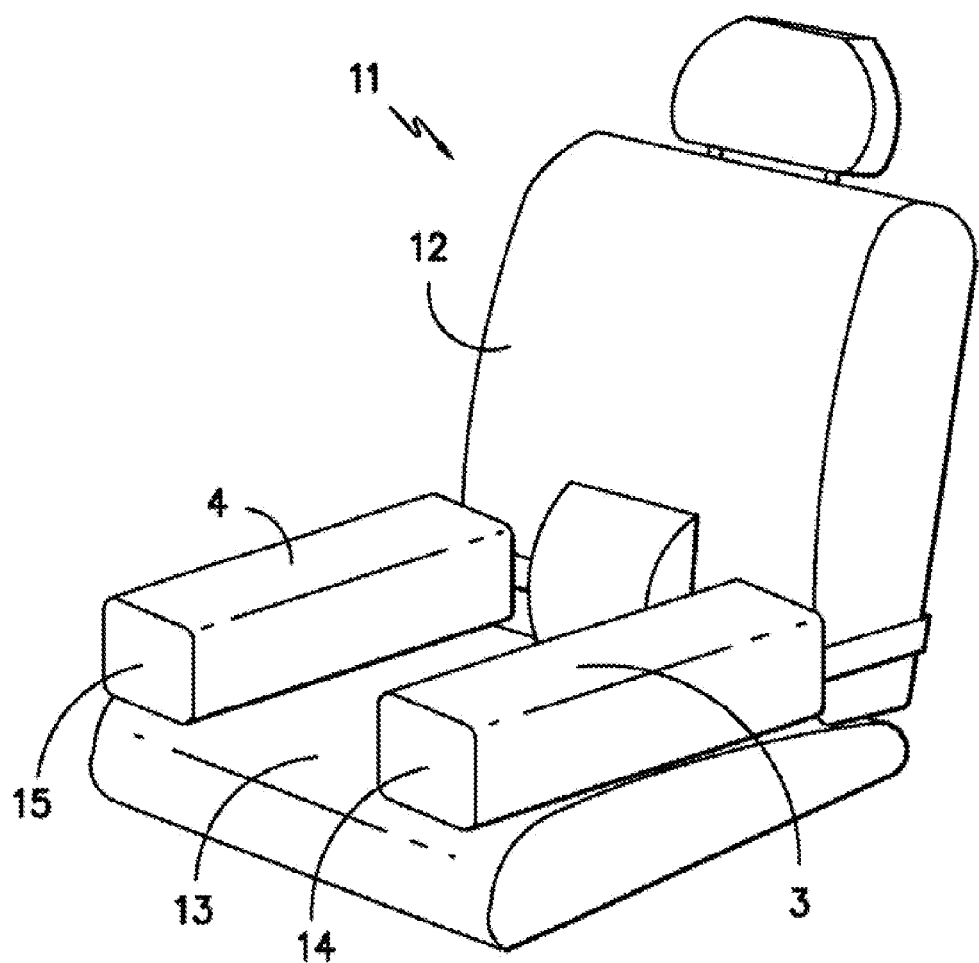
FIG. -2-

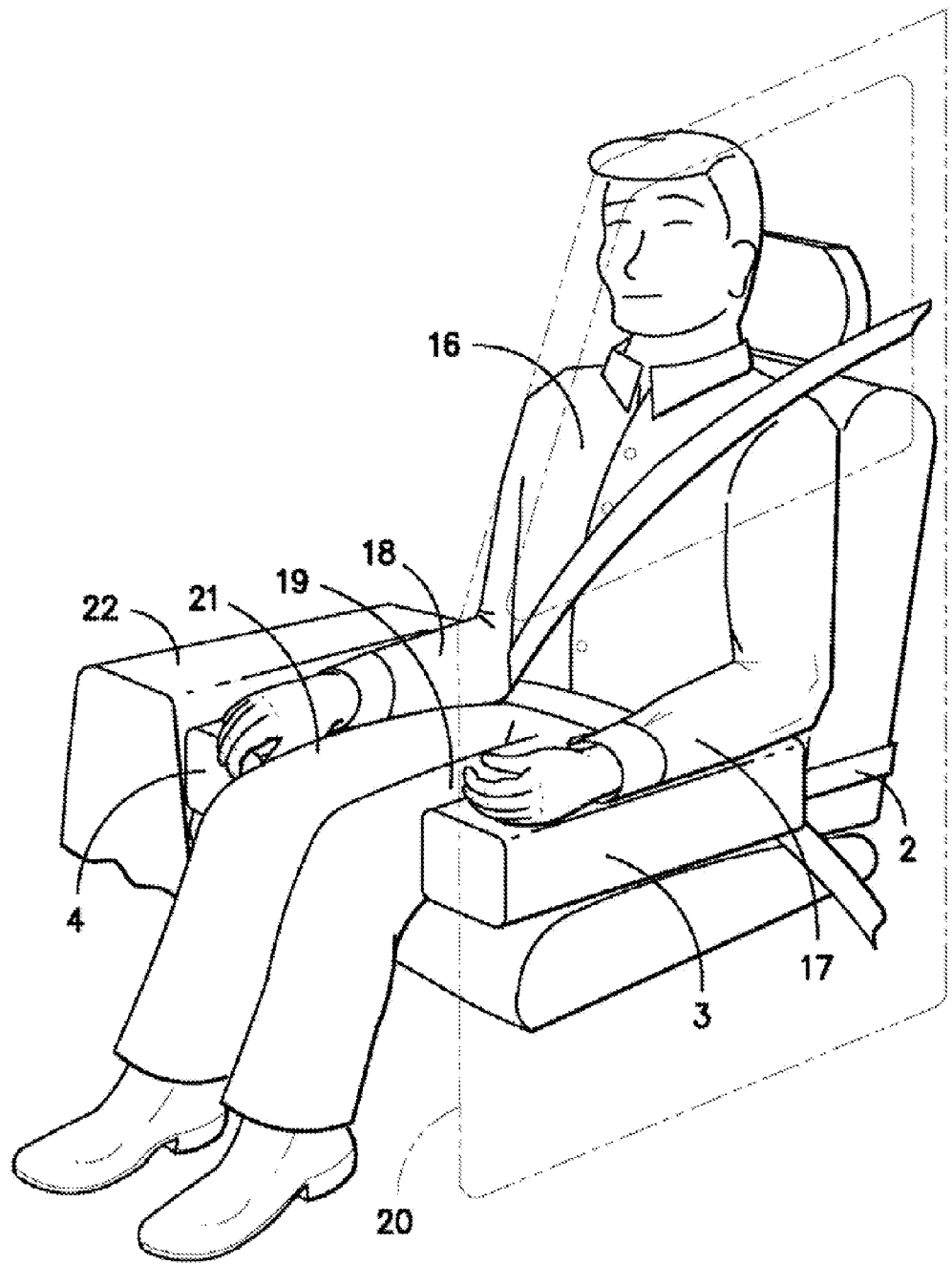
FIG. -3-

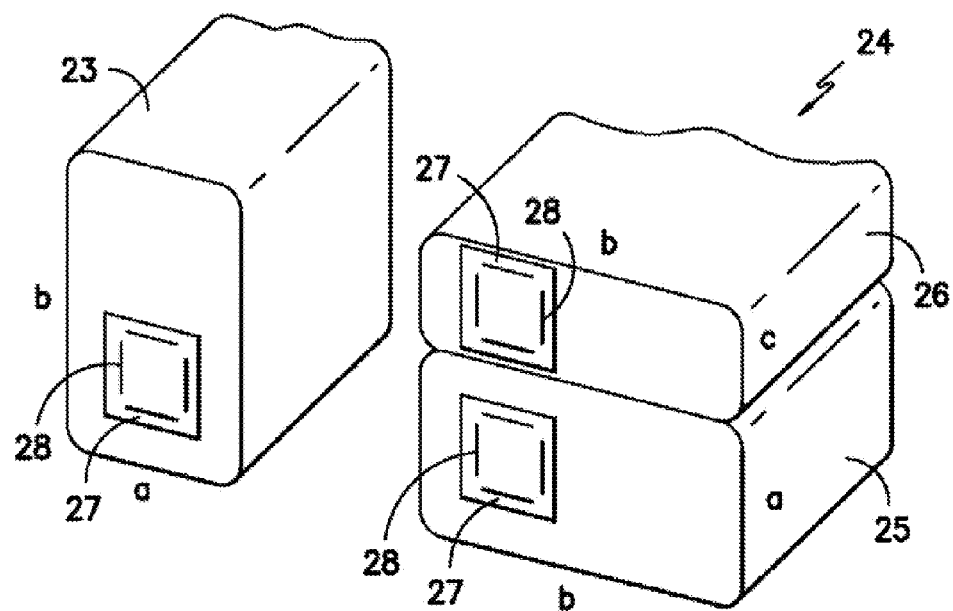
FIG. −4−

ERGONOMIC ARM SUPPORT FOR VEHICLE OCCUPANT

This invention is directed to an adjustable arm support for the occupant of a vehicle, which can be easily installed on or detached from a vehicle seat. The arm support does not interfere with a driver's ability to steer the vehicle.

BACKGROUND OF THE INVENTION

It is well known that driving a vehicle can strain the neck, shoulders and arms of a driver. Some drivers seek support by leaning against the door, window ledge or console. But, the failure to maintain an upright posture can cause imbalances in the muscles supporting the spine and negatively impinge upon one's nervous system. Various prior art devices have been proposed to support the arms of a vehicle driver or passenger.

Clarke—U.S. Pat. No. 2,168,976 discloses a pair of adjustable cushions mounted on a rigid, cross-supporting rail. The rail rests on the driver's lap.

Gorman—U.S. Pat. No. 2,524,659 provides a portable armrest that can be placed on a bench seat next to the driver. The armrest has a wire projection that is inserted in the crack between the bottom seat and the back rest. The armrest does not provide bilateral support.

Conning—U.S. Pat. No. 2,602,488 discloses a detachable armrest supported by a frame, which hangs from the back rest of the seat. While providing arm support, the frame is interposed between the seat back and the upper arms of the driver, which is likely to lead to discomfort. The frame may not be compatible with modern vehicle seat designs.

Hall et al.—U.S. Pat. No. 6,508,513 B1 provide a portable armrest having a U-shaped frame that attaches to a vehicle seat back. The frame supports retractable arm support members. The frame is clamped to the sides of the vehicle seat, which appears to be inadequate to support the armrests, for example, if the driver chose to shift his or her weight by leaning on the armrest.

Santa Cruz et al.—U.S. Pat. No. 6,164,725 disclose a detachable passenger armrest for motorcycles. A "U-shaped" bracket supporting an arm cushion at each end can be fastened to the back of a passenger back rest, for example, by bolting the bracket in place. The armrest does not appear to be compatible with a typical seat in an automobile or truck.

Pearson—U.S. Pat. No. 7,644,990 B2 provides a body support to assist a passenger in a vehicle to sleep in a seated position. The support apparatus has first and second side arm support members and a collar member for supporting the passenger's head. The body support is not suggested for use by a driver and such use appears likely to interfere with the operation of a vehicle.

Despite the proliferation of armrests disclosed in the prior art, there is an unfulfilled need for an ergonomic, comfortable, economical, easy-to-install, detachable support for both arm's of the occupant of a vehicle, which places a minimum of restrictions on the occupant's movements, particularly the driver's movements.

SUMMARY OF THE INVENTION

The present invention is an arm support for a occupant seated in a vehicle. The vehicle seat has a back rest and a bench. The arm support is particularly useful with a vehicle having bucket seats for the driver and passenger, and a center console. The arm support has a flexible, circular strap proportioned to encircle the seat back rest. First and second bolsters are provided, each having a forward end and a rear end. The rear end of each of the first and second bolsters is attached to the strap, with the bolsters spaced apart along the strap at a distance approximating the width of the user's hips. Optionally, a lumbar pad is attached to the strap, between the points of attachment of the first and second bolsters.

The first and second bolsters, and also the lumbar pad, may be slidable along the strap, so that the arm support may be readily adjusted to accommodate occupants of varying size and seats of various constructions. The first and second bolsters are designed to lie on the seat bench, with the forward ends extending outward from the seat back. The bolster may lie alongside the outside of the thighs of a seated person and are proportioned to provide support for the elbows and/or forearms of the seated person, thereby partially supporting the weight of the person's arms.

In one embodiment of the invention, the support apparatus is installed in a vehicle having bucket seats and a center console. For example, one of the bolsters can be positioned between the driver's outer left thigh and the inside of the driver's door and the other bolster can be positioned between the driver's outer right thigh and the center console. The width of the bolster can be proportioned to fill the space between the outside of the driver's thighs and the inside of the driver's door and center console, thereby providing support for the person's legs and promoting good posture. The position of the driver relative to the console will be reversed for vehicles with the steering wheel on the right side. Additionally, the positions of the bolsters relative to the center console and the door will be reversed for use by a passenger in the front seat of the vehicle.

The bolsters may be readily moldable to the contours of the space between the outside of the occupant's thighs and the nearest rigid structure in the vehicle. The size of the bolsters, particularly their widths, may be the same or different. In one embodiment, the bolsters may extend to the same height above the seat bench and have different widths.

The bolsters are designed to support the arms and relieve tension from the shoulders and neck, without interfering with movement of the arms. Accordingly, the height of the bolster, when the bolster is lying on the seat bench, is below the seated occupant's sternum. It is believed that a bolster height of from 3 inches to 12 inches, in particular 4 to 8 inches, will provide support for the elbows and forearms of a seated person, without interfering with the operation of the vehicle. The bolsters may conveniently be from 10 to 20 inches, in particular 12 to 18 inches, in length. In one embodiment of the invention, when the arm support is installed on the seat of the vehicle, the arm support is not interposed between the triceps brachii muscles and the seat back rest. In other words, the backs of the occupant's uppers arms may conveniently rest against the seat back rest, for example, while driving, thereby promoting good posture.

The strap may be adjustable in length, or portions of the strap may be elastic, or a combination of length adjustment and elasticity may be employed, so that the strap can be readily fitted around the back rest of a vehicle seat. In one embodiment, a continuous strap may be threaded through slits, grommets, loops, etc. located on the rear ends of the bolsters. Once the support apparatus is installed around the seat's back rest, the continuous strap can be adjusted to remove any slack and the bolsters slid along the strap to the desired position. The strap keeps the bolsters in place while the vehicle is in operation and keeps the bolsters from falling out, when the driver or passenger is entering and exiting the vehicle.

The bolsters may be conveniently provided with a cover, for example, a woven, knitted or non-woven textile fabric made of natural or synthetic fibers, or combination thereof. Underneath the cover, the bolsters are made sufficiently flexible to provide a cushioned surface in contact with the user's elbows and/or forearms, yet sufficiently resilient to partially support the weight of the arms, thereby relieving tension for the user's shoulders and neck. The bolster may be filled with a single material, be made of layers of material, or may be made with a core and sheath arrangement, for example, an inner core of high density foam, for example, 2.5 to 4 lbs. per $ft^3$, surrounded by viscoelastic foam. The bolster may be filled with a free flowing material, so that the shape of the bolster can readily conform to fill the space between the user's legs and the vehicle.

BRIEF DESCRIPTION OF THE DRAWINGS

FIG. 1 is a perspective view of the arm support.

FIG. 2 is a perspective view of the arm support installed on a vehicle seat.

FIG. 3 is a perspective view of the arm support being used by the driver of a vehicle.

FIG. 4 is a side view of two bolsters of varying width, wherein one of the bolsters is constructed with two elements joined together.

DETAILED DESCRIPTION OF THE INVENTION

Without limiting the scope of the invention, the preferred embodiments and features are hereinafter set forth. All of the United States patents that are cited in the specification are hereby incorporated by reference.

Referring to FIG. 1, arm support 1 has strap 2 with bolsters 3 and 4 attached in spaced apart relation. Lumbar pad 5 is positioned on strap 2, approximately midway between bolsters 3 and 4.

Strap 2 is a flexible material having sufficient strength to be secured around the back rest of a vehicle seat, to maintain the position of bolsters 3 and 4 and lumbar pad 5. The cross section of strap 2 may be flat, round or other geometric shape, so long as the strap does not interfere with the movements of the user or, in embodiments of the invention without a lumbar pad, does not cause back discomfort. By way of example, strap 2 may be a strip of belt webbing, such as is used for vehicle seat belts or for belts worn around the waist to support clothing. Alternatively, all or a portion of strap 2 may be elastic, that is, such elastic portion can increase in length by 50% or more when stretched and return to its original shape. Strap 2 may be constructed of natural or synthetic fibers, or combinations thereof, including nylon, polyester, spandex and cotton. Strap 2 is provided with buckle 6, for cinching arm support 1 in place around a seat back rest, as shown in FIG. 2. Buckle 6 may have a quick release feature, to easily disengage or adjust the arm support.

Various methods may be employed to attached bolsters 3 and 4 and lumbar pad 5 to strap 2. For example, the bolster and lumbar pad may be fixed in place by, for example, sewing, or attached by Velcro® or other hook and loop fastening systems. In one embodiment of the invention, bolsters 3 and 4 and lumbar pad 5 are attached as to be slidable along strap 2. Referring to FIG. 1, the rear ends 7 and 8 of bolsters 3 and 4, respectively, and the back side of lumbar pad 5 are provided with guides 9 having slots 10, through which strap 2 is threaded. Alternatively, strap 2 may be threaded through a pair of grommets provided in the rear ends of the bolsters and back side of the lumbar pad.

The bolsters may be provided with a cover, which for the purposes of cleaning or replacement may be easily removed. In one embodiment of the invention, each bolster has a cover with an upper side (facing upward from the seat bench) having a relatively low coefficient of friction material, so that the user's elbow and/or forearm can readily slide on the surface, and a lower side (resting on the seat bench) having a relatively high coefficient of friction material, so that the bolsters tend to stay in place on the seat bench.

The bolsters may be constructed out of a variety of materials. By way of example, the bolster may contain resilient foam, such as polyurethane foam, especially viscoelastic foam, foam pieces, such as foamed polystyrene "peanuts" or balls or chopped-up foam, beans, seed husks, or combinations of the same. In one embodiment, the bolsters have multiple layers of resilient material, with, for example, a high-density core or bottom layer and a viscoelastic upper layer or sheath in contact with the user's elbows and/or lower arms. In one embodiment of the invention, the bolster has a multiple layer construction with a cushioned surface in contact with a user's arms and a lower surface or core that may be a filling of loose material, inflatable air chamber, open or closed plastic tube or solid material.

The bolsters are shown in FIG. 1 as being cylindrical in shape, that is, with a circular cross section. The invention is not limited, however, to a particular shape of bolster. For example, the bolsters may have the cross section of an oval, triangle, quadrilateral, or polygon with five or more sides. Of particular interest are bolsters having a quadrilateral cross section, wherein the height of the bolster, as measured vertically when the bolster is lying on a seat bench, varies when the bolster is rotated 90°. Examples include bolsters having a rectangular cross section with adjacent sides of different length, and bolsters having a cross section in the shape of a parallelogram, trapezoid or trapezium (no sides parallel). Accordingly, the height of a bolster may be changed by one inch or more or even two inches or more by rotating the bolster by 90° or 180°, to accommodate various body sizes and vehicle interior designs.

The bolsters may be filled with loose, free-flowing filling material to create a "bean bag" effect. The bolsters are then able to conform to fill the space between the outside of the user's thigh and the inside of the user's door or center console, as further described herein.

The height of an individual bolster may be adjustable, for example, by providing an inflatable bladder or inserts that can be stuffed into a bolster cover, to provide more or less filling. Also within the scope of the invention is to provide a bolster with multiple chambers or bladders, so that they may be selectively filled, partially filled or left empty, to create the desired dimensions and firmness of the bolster.

In another embodiment of the invention, the bolsters are provided in several sizes, such as small, medium, large and extra-large, to accommodate different body sizes and types, different seat designs and different vehicle interior layouts, particularly vehicles in which the space between the user's one thigh and the door and the user's opposite thigh and the center console are significantly different. Accordingly, the two bolsters may have approximately the same height, that is, vary in height by less than one inch, but vary in width by one inch or more, or even two inches or more.

Referring to FIG. 2, arm support 1 is shown installed on seat 11. Strap 2 is cinched around back rest 12, and bolsters 3 and 4 lie on bench 13, with the forward ends 14 and 15 of the bolsters extending away from back rest 12.

Referring to FIG. 3, driver 16 is shown seated in a vehicle, with arm support 1 installed on seat 11. Arms 17 and 18 of driver 16 are supported on bolsters 3 and 4, respectively. Bolsters 3 and 4 are shown filling the negative space between the driver's thigh 19 and the inside of vehicle door 20 and between the driver's thigh 21 and the vehicle center console 22, respectively. In one embodiment of the invention, the bolsters exert sideways pressure against the outside of the driver's thigh to gently urge the legs together and/or hinder the legs from rolling outward.

Also within the scope of the invention is to provide a pair of bolster, wherein at least one of the bolsters is constructed of two or more joined elements. For example, referring to FIG. 4, a first bolster 23 has a rectangular cross-section with sides a and b, wherein in b is greater than a by one inch or more, and a second bolster 24 is comprised of two elements each having a rectangular cross-section, with the first element 25 having a cross-section with sides a and b, and a second element 26 having a cross-section with sides b and c. In FIG. 4, elements 25 and 26 are proportioned so that, a and b are the same dimensions in bolster 23 and element 25, a+c=b, and the second bolster is turned with side b horizontal. In one example, side a and side c vary by ½ inch or more, or even 1 inch or more. Elements 25 and 26 forming bolster 24 may be joined together by hook and loop fasteners, such as Velcro® or wrapped with a band. Alternatively, second bolster 24 may be turned with side b aligned vertically, so that regardless of the dimensions of side c, bolster 23 and bolster 24 will be at the same height. It is also within the scope of the invention to use bolsters 23 and 25 together and bolster 26 separately. Each bolster has a guide 27, with slots 28 that allow the bolsters to be rotated 90° and threaded onto a strap.

Based on the foregoing description, it may be understood that the ergonomic arm support of the present invention may be provided as a kit, having three bolsters that can be mixed and matched to achieve a comfortable fit for the occupant of a vehicle. In one embodiment, all three of the bolsters have at least one dimension (width or height) in common. In another embodiment of the invention, two of the bolsters may be stacked vertically to achieve the same height as the height of the third bolster, during use.

The present invention can be used in combination with virtually any vehicle seat, regardless of whether the steering wheel is on the right or left side of the vehicle. It can be used by any and all drivers and passengers, and is neither culturally restrictive nor age restrictive. Young drivers could use the arm support as a preventative measure, to avoid developing stress related problems with the neck and shoulders, and seasoned drivers can reduce existing conditions through continued use. Essentially the user should experience immediate pleasure once the cushions are positioned under the arms, and the user is able to "drop" their shoulders and release the tension in the neck and shoulder muscles. Use of the invention does not impede the range of motion of the driver's arms, or otherwise pose a safety hazard. The arm support is easily removable and flexibly attached to the car seat, and once installed, is held in place by the straps around the seat back.

The invention may be further understood by reference to the following claims.

I claim:

1. An apparatus for supporting the occupant of a vehicle, comprising:
   (a) a seat installed in the vehicle, wherein the seat has a bench and a back rest;
   (b) a flexible, circular strap encircling the seat back rest;
   (c) a first bolster having a forward end and a rear end, with the rear end of the first bolster attached to the strap, with the first bolster lying on the seat bench and the forward end of the first bolster extending away from the back rest of the seat;
   (d) a second bolster having a forward end and a rear end, with the rear end of the second bolster attached to the strap, with the second bolster lying on the seat bench and the forward end of the second bolster extending away from the back rest of the seat;
   (e) the first and second bolsters are proportioned to support the occupant's arms, while the occupant is seated in the vehicle seat; and
   (f) wherein a distance between the rear end of the first bolster and the rear end of the second bolster is adjustable.

2. The apparatus of claim 1, wherein the rear ends of the first and second bolsters are independently slidable along the strap.

3. The apparatus of claim 2, further comprising a lumbar pad attached to the strap, between the first and second bolsters.

4. The apparatus of claim 1, wherein the seat is a bucket seat.

5. The apparatus of claim 1, wherein the strap is adjustable in length.

6. The apparatus of claim 1, wherein the first and second bolsters have a height of from 3 to 12 inches, measured vertically when the bolsters are lying on the seat bench, and a length of from 10 to 20 inches.

7. The apparatus of claim 1, wherein the first and second bolsters are proportioned to support the occupant's elbows and forearms, while the occupant is seated in the vehicle seat.

8. The apparatus of claim 1, wherein the forward end of the first and second bolsters are pivotable relative to the strap.

9. The apparatus of claim 1, wherein at least one of the first and second bolsters is constructed of two or more joined elements.

10. The apparatus of claim 1, wherein the first and second bolsters have a rectangular cross-section.

11. An apparatus for supporting the occupant of a vehicle, comprising:
   (a) a seat installed in the vehicle, wherein the seat has a bench and a back rest;
   (b) a flexible, circular strap encircling the seat back rest;
   (c) a first bolster having a forward end and a rear end, with the rear end of the first bolster attached to the strap, with the first bolster lying on the seat bench and the forward end of the first bolster extending away from the back rest of the seat;
   (d) a second bolster having a forward end and a rear end, with the rear end of the second bolster attached to the strap, with the second bolster lying on the seat bench and the forward end of the second bolster extending away from the back rest of the seat;
   (e) the first and second bolsters are proportioned to support the occupant's arms, while the occupant is seated in the vehicle seat; and
   (f) wherein the forward end of the first bolster and the forward end of the second bolster are pivotable relative to the strap.

12. The apparatus of claim 11, wherein the rear ends of the first and second bolsters are slidable along the strap.

13. The apparatus of claim 11, wherein the first and second bolsters have a height of from 3 to 12 inches, measured vertically when the bolsters are lying on the seat bench.

14. The apparatus of claim 13, wherein the first and second bolsters have a length of from 10 to 20 inches.

15. The apparatus of claim 11, further comprising a lumbar pad attached to the strap between the first and second bolsters, wherein the lumbar pad is slidable along the strap.

16. The apparatus of claim 11, wherein a width of the first bolster and a width of the second bolster vary by one inch or greater.

17. The apparatus of claim 11, wherein the strap is adjustable in length.

18. The apparatus of claim 11, wherein the first and second bolsters comprise a viscoelastic polyurethane foam supporting the arms of the person seated in the vehicle seat.

19. The apparatus of claim 11, wherein each of the first and second bolsters comprise an inflatable bladder.

20. The apparatus of claim 11, wherein the strap comprises an elastic portion which can be increased in length by 50% or more and return to its original length.

* * * * *